(12) United States Patent
Nonaka et al.

(10) Patent No.: US 6,903,898 B2
(45) Date of Patent: Jun. 7, 2005

(54) PRESSURE-SENSITIVE ADHESIVE LABEL FOR HARD DISK DRIVE

(75) Inventors: Takahiro Nonaka, Ibaraki (JP); Yasuyuki Tokunaga, Ibaraki (JP); Naoyuki Nishiyama, Ibaraki (JP); Shinji Inokuchi, Ibaraki (JP); Masahiro Ohura, Ibaraki (JP); Akihisa Murata, Ibaraki (JP); Yasunori Sugihara, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 196 days.

(21) Appl. No.: 10/127,724

(22) Filed: Apr. 23, 2002

(65) Prior Publication Data

US 2002/0191331 A1 Dec. 19, 2002

(30) Foreign Application Priority Data

| Apr. 23, 2001 | (JP) | ................................ | P2001-123792 |
| Apr. 24, 2001 | (JP) | ................................ | P2001-125514 |
| Apr. 24, 2001 | (JP) | ................................ | P2001-125515 |
| Apr. 26, 2001 | (JP) | ................................ | P2001-128552 |

(51) Int. Cl.⁷ .............................................. G11B 5/012
(52) U.S. Cl. .................................................. 360/97.01
(58) Field of Search ........................... 360/97.01, 97.02

(56) References Cited

U.S. PATENT DOCUMENTS

| 5,732,464 A | 3/1998 | Lamont |
| 6,110,552 A | 8/2000 | Casey et al. |
| 6,172,842 B1 | 1/2001 | Satoh et al. |
| 6,266,207 B1 | 7/2001 | Iwahara et al. |
| 6,636,378 B2 * | 10/2003 | Tokunaga et al. ........ 360/97.01 |
| 2001/0009486 A1 | 7/2001 | Iwahara et al. |

FOREIGN PATENT DOCUMENTS

| EP | 0 614 959 A1 | 9/1994 |
| JP | 10-233086 A | 9/1998 |
| JP | 11-232833 A | 8/1999 |
| JP | 11-232862 A | 8/1999 |
| WO | 01/75889 A1 | 10/2001 |

* cited by examiner

Primary Examiner—George Letscher
(74) Attorney, Agent, or Firm—Birch, Stewart, Kolasch & Birch, LLP (57) ABSTRACT

A pressure-sensitive adhesive label has a base having an information indication portion on its one surface thereof, and a pressure-sensitive adhesive layer formed on another surface of the base. After peeling a release liner, the label is stuck on an outer surface of a housing of the hard disk drive to reduce noise generated when the hard disk drive is driven. The release liner for coating the pressure-sensitive adhesive layer has an antistatic function and a cut line. The adhesive force of the adhesive layer is reduced by heating. The label has a surface density of not lower than 0.18 (kg/m²).

12 Claims, 4 Drawing Sheets

PRESSURE-SENSITIVE ADHESIVE LABEL FOR HARD DISK DRIVE

The present application is based on Japanese Patent Applications No. 2001-123792, 2001-125514, 2001-125515 and 2001-128552, which are incorporated herein by reference.

BACKGROUND OF THE INVENTION

1. Field of the Invention

The present invention relates to a pressure-sensitive adhesive label for a hard disk drive, which is used in a state that the pressure-sensitive adhesive label is stuck on the outer surface of a housing of a hard disk drive so as to exert a function of various indications as a primary function of a pressure-sensitive adhesive label and so as to reduce noise generated when the hard disk drive is driven.

2. Description of the Related Art

In recent years, there is a greatly increasing demand for civilian hard disk drives for use in personal computers and so on. Along with this demand, a property of miniaturization of the hard disk drive itself and a property of reduction in generated noise (securement of silence) at the time of driving of the hard disk drive have been treated to be as important as the property of increase in storage capacity.

As a measure to reduce noise generated when a hard disk drive is driven, a vibration damping steel sheet is generally used on a part (for example, a cover) of a housing of the hard disk drive. However, the method using a vibration damping steel sheet cannot yet be rated as a satisfactory measure from the point of view of reduction in size and weight, reduction in noise, productivity or cost particularly for a hard disk drive having recording disks each with a diameter not larger than 2.5 inches.

Therefore, the present inventor et al. proposed a pressure-sensitive adhesive label for a hard disk drive (hereinafter, occasionally referred to as "HDD pressure-sensitive adhesive label") which was stuck on the outer surface of a housing of a hard disk drive so as to reduce noise generated when the hard disk drive was driven. By use of such an HDD pressure-sensitive adhesive label, reduction in noise can be attained while the information indication function is exerted. The HDD pressure-sensitive adhesive label has a pressure-sensitive adhesive layer normally coated (protected) with a release liner until the HDD pressure-sensitive adhesive label is used (stuck). When the HDD pressure-sensitive adhesive label is used, the release liner is released to expose the surface of the pressure-sensitive adhesive layer, and then the HDD pressure-sensitive adhesive label is stuck onto the outer surface of a housing of a hard disk drive.

On the other hand, a precision electronic apparatus such as a hard disk drive may be broken due to weak static electricity. Such a precision electronic apparatus is required to be prevented from being broken by static electricity.

In the HDD pressure-sensitive adhesive label, however, static electricity may be generated to cause peeling electrification when the release liner coating the pressure-sensitive adhesive layer is released from the HDD pressure-sensitive adhesive label. There is a possibility that a weak current generated at this time causes a failure in the precision electronic apparatus. Therefore, the HDD pressure-sensitive adhesive label is required to have a small amount of peeling electrification generated when the release liner is released.

Further, in the HDD pressure-sensitive adhesive label, however, damage such as curling in the HDD pressure-sensitive adhesive label as a whole or wrinkles produced therein comes into problem when the release liner coating the pressure-sensitive adhesive layer is released. It is therefore necessary to prevent such damage when the release liner is released. Further, when the HDD pressure-sensitive adhesive label in which the release liner has been released to expose the pressure-sensitive adhesive layer is to be stuck onto a hard disk drive, it is difficult to position the place where the HDD pressure-sensitive adhesive label is to be stuck on the hard disk drive because the pressure-sensitive adhesive layer has been exposed thoroughly. Accordingly, the workability in sticking the HDD pressure-sensitive adhesive label is low. Further, with weight reduction in the hard disk drive, reduction in thickness of the pressure-sensitive adhesive label is demanded accordingly. Along with this demand, it is anticipated that the pressure-sensitive adhesive label will be damaged easily when release liner is released. Thus, the solution to the problems is required more and more strongly.

On the other hand, in recent years, a product in which a hard disk drive has been incorporated, for example, various computer equipment such as a personal computer or a server or household appliances as a video/audio recording apparatus, are disassembled after retirement so that various parts are reused (recycled).

HDD pressure-sensitive adhesive labels are, however, stuck on hard disk drives manually or automatically by machines. For example, when a wrong HDD pressure-sensitive adhesive label is stuck, the HDD pressure-sensitive adhesive label has to be peeled after the sticking. Further, when hard disk drives are reused, HDD pressure-sensitive adhesive labels stuck on the hard disk drives have to be peeled. In spite of such increasing necessity to peel HDD pressure-sensitive adhesive labels which have been once stuck, it is difficult to peel, with ease, the related-art HDD pressure-sensitive adhesive labels after the HDD pressure-sensitive adhesive labels have been once stuck. Thus, there has occurred a problem that the workability in peeling the HDD pressure-sensitive adhesive labels is low. A requirement made on an HDD pressure-sensitive adhesive label is that the HDD adhesion label exhibiting adherence excellent enough not to be peeled easily when it is stuck, while the HDD pressure-sensitive adhesive label can be peeled easily when it has to be peeled.

SUMMARY OF THE INVENTION

A first object of the invention is to provide an HDD pressure-sensitive adhesive label in which the voltage level of peeling electrification generated when a release liner of the HDD pressure-sensitive adhesive label is released is reduced so that damage to the hard disk drive caused by the peeling electrification can be suppressed or prevented.

A second object of the invention is to provide an HDD pressure-sensitive adhesive label in which damage to the pressure-sensitive adhesive label caused when a release liner of the HDD pressure-sensitive adhesive label is released can be suppressed or prevented so that the workability when the release liner is released can be further improved.

A third object of the invention is to provide an HDD pressure-sensitive adhesive label which can be peeled easily when the HDD pressure-sensitive adhesive label stuck on a hard disk drive has to be peeled, and a method for peeling the pressure-sensitive adhesive label from the hard disk drive on which the pressure-sensitive adhesive label has been stuck.

A fourth object of the invention is to provide an HDD pressure-sensitive adhesive label which can provide a possibility of solving the foregoing problem when a pressure-sensitive adhesive label stuck on a hard disk drive to keep airtightness and to indicate information is provided with a function of reducing noise generated when the hard disk drive is driven.

That is, a first invention provides a pressure-sensitive adhesive label for a hard disk drive, which includes an information indication portion in one surface of a base, and a pressure-sensitive adhesive layer on the other surface of the base. The pressure-sensitive adhesive label for a hard disk drive is stuck on the outer surface of a housing of a hard disk drive so that noise generated when the hard disk drive is driven can be reduced. The pressure-sensitive adhesive label for a hard disk drive has a feature that the pressure-sensitive adhesive layer is coated with a release liner having an antistatic function.

According to the first invention, the release liner having an antistatic function may have a structure in which an antistatic-treated layer has been formed on at least one surface of a base. It is preferable that the release liner having an antistatic function has one selected from a structure of an antistatic-treated layer and a base, and a structure of a base, an antistatic-treated layer and a base. Further, the antistatic-treated layer may be constituted by either one of metal foil and a metal-vapor-deposited film.

A second invention provides a pressure-sensitive adhesive label for a hard disk drive, which includes an information indication portion in one surface of a base, and a pressure-sensitive adhesive layer on the other surface of the base. The pressure-sensitive adhesive label for a hard disk drive is stuck onto the outer surface of a housing of a hard disk drive so that noise generated when the hard disk drive is driven can be reduced. The pressure-sensitive adhesive label for a hard disk drive has a feature that the pressure-sensitive adhesive layer is coated with a release liner having at least one cut line.

According to the second invention, it is preferable that split portions split by the at least one cut line have areas different in size in the release liner having the at least one cut line. The at least one cut line in the release liner may be formed into either one of a continuous line and a perforated line. Further, two or more cut lines may be provided in the release liner.

Further, according to the second invention, it is preferable that the release liner having the at least one cut line is constituted by a polyolefin-based film. Furthermore, it is preferable that the release liner having the at least one cut line has a structure in which a release-treated layer made of a polyolefin-based film is formed on at least one surface of a substrate. Particularly according to the invention, it is preferable that the release liner having the at least one cut line contains a silicone-free release agent as its release agent.

A third invention provides a pressure-sensitive adhesive label for a hard disk drive, which includes an information indication portion in one surface of a base, and a pressure-sensitive adhesive layer on the other surface of the base. The pressure-sensitive adhesive label is stuck on the outer surface of a housing of a hard disk drive so that noise generated when the hard disk drive is driven can be reduced. The pressure-sensitive adhesive label is a pressure-sensitive adhesive label for a hard disk drive having a feature that the pressure-sensitive adhesive label has a function of reducing adhesive force due to the pressure-sensitive adhesive layer by heating.

According to the third invention, the pressure-sensitive adhesive layer may be formed out of a pressure-sensitive adhesive composition containing a thermo-foamable agent which can be foamed by heating. As the thermo-foamable agent, thermo-expandable microspheres can be used preferably.

The third invention also includes a method for peeling the pressure-sensitive adhesive label for a hard disk drive from a hard disk drive on which the pressure-sensitive adhesive label has been stuck. The method has a feature that the hard disk drive on which the pressure-sensitive adhesive label for a hard disk drive has been stuck is heated so as to heat at least the pressure-sensitive adhesive layer of the pressure-sensitive adhesive label for a hard disk drive and thereby peel the pressure-sensitive adhesive label stuck on the hard disk drive from the hard disk drive.

A fourth invention provides a pressure-sensitive adhesive label for a hard disk drive, which includes a pressure-sensitive adhesive layer on one surface of a base and which is stuck on an outer surface of a housing of a hard disk drive so as to reduce noise generated when said hard disk drive is driven. The pressure-sensitive adhesive label for a hard disk drive has a feature that the pressure-sensitive adhesive label has a surface density of not lower than 0.18 ($kg/m^2$).

According to the fourth invention, the base of the pressure-sensitive adhesive label may be constituted by metal foil and resin film layers laminated on opposite sides of the metal foil. It is preferable that the metal foil forming the base is not thinner than 5 $\mu$m. Each of the resin film layers forming the base may be a polyethylene terephthalate film.

It is also preferable that the pressure-sensitive adhesive layer of the pressure-sensitive adhesive label is protected by a release liner using a silicone-free release agent as its release agent. The pressure-sensitive adhesive layer may be formed on at least a part of one surface of the base.

The fourth invention also includes a method for reducing driving noise of a hard disk drive including a box-shaped housing body for receiving recording disks, and a top cover paired with the housing body. The method has a feature that the pressure-sensitive adhesive label for a hard disk drive is stuck onto an outer surface of the top cover and/or the housing body, or onto bores formed in the top cover and/or the housing body.

Features and advantages of the invention will be evident from the following detailed description of the preferred embodiments described in conjunction with the attached drawings.

DETAILED DESCRIPTION OF THE PREFERRED EMBODIMENTS

[HDD Pressure-sensitive Adhesive Label]

Figure 1:
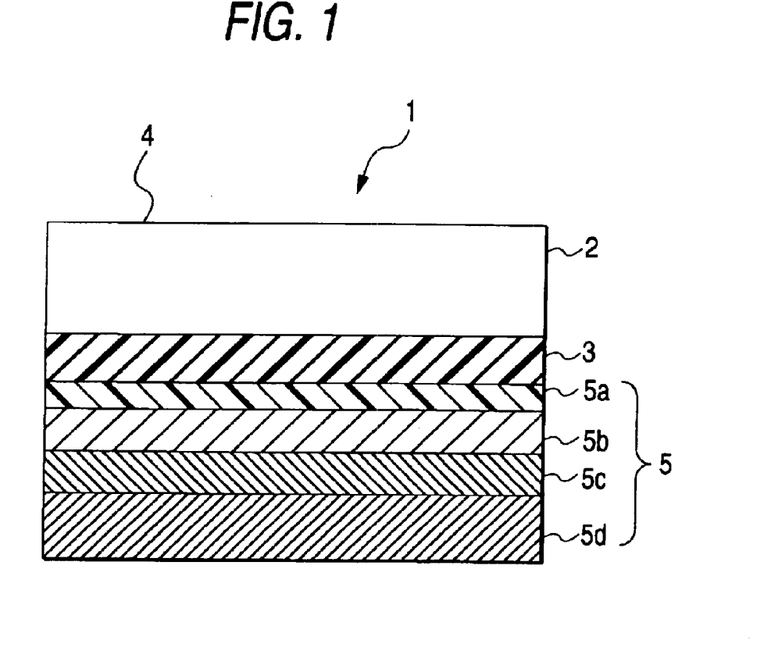
FIG. 1 is a schematic sectional view showing an embodiment of a pressure-sensitive adhesive label for a hard disk drive according to the invention.

The invention will be described below with reference to the drawings. FIG. 1 is a schematic sectional view showing an embodiment of a pressure-sensitive adhesive label for a hard disk drive according to the invention. In FIG. 1, the reference numeral 1 represents a pressure-sensitive adhesive label for a hard disk drive (HDD pressure-sensitive adhesive label); 2, a base (label base); 3, a pressure-sensitive adhesive layer; and 4, an information indication portion in the HDD pressure-sensitive adhesive label 1. In addition, the reference numeral 5 represents a release liner. In the release liner 5, the reference numeral 5a represents a mold-release-treated layer; 5b, a base (liner base); 5c, an antistatic-treated layer; and 5d, a base (liner base). The HDD pressure-sensitive adhesive label 1 according to FIG. 1 has the information indication portion 4 on one surface (back side) of the base 2, and the pressure-sensitive adhesive layer 3 on the other surface of the base 2. The pressure-sensitive adhesive layer 3 is coated with and protected by the release liner 5.

Figure 2:
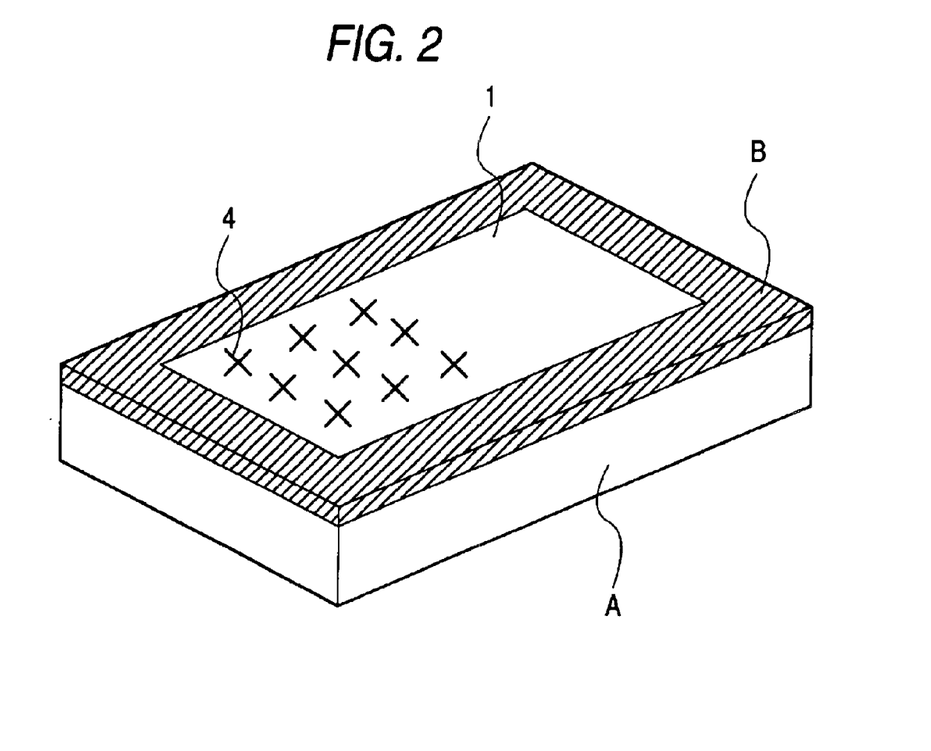
FIG. 2 is a schematic view showing a hard disk drive on which the pressure-sensitive adhesive label for a hard disk drive according to the invention has been stuck.

In addition, FIG. 2 is a schematic view of a hard disk drive on which the pressure-sensitive adhesive label for a hard disk drive according to the invention has been stuck. In FIG. 2, the reference numerals 1 and 4 represent parts corresponding to those in FIG. 1. Specifically, the reference numeral 1 represents an HDD pressure-sensitive adhesive label; and 4, an information indication portion. In addition, the symbol A represents a housing body; and B, a top cover. In FIG. 2, the HDD pressure-sensitive adhesive label 1 having the information indication portion 4 in its surface (back side) has been stuck on the outer surface of the top cover B of the hard disk unit constituted by the housing body A receiving recording disks, a magnetic head, a spindle motor, etc., and the top cover B. Incidentally, the HDD pressure-sensitive adhesive label 11 can be stuck after the release liner 5 is released from the pressure-sensitive adhesive layer 3 of the HDD pressure-sensitive adhesive label 1.

In the invention, there is a requirement that when the HDD pressure-sensitive adhesive label 1 is stuck on the outer surface of a housing (for example, the top cover 3 or the housing body A in FIG. 2) of a hard disk drive, the HDD pressure-sensitive adhesive label 1 can reduce noise generated during the driving of the hard disk drive (hereinafter, occasionally referred to as "driving noise" simply). Here, the words "can reduce driving noise of a hard disk drive" means that driving noise can be lowered (reduced) by at least 1 dB by the sticking of the HDD pressure-sensitive adhesive label according to the invention.

In addition, the HDD pressure-sensitive adhesive label 1 includes, on its base surface (back side), the information indication portion 4 for indicating, for example, "instructions for use", "connection method", and "recognition/identification such as product name or manufacturer name". In such a structure, a function of reducing driving noise can be added to the HDD pressure-sensitive adhesive label which heretofore has had only the information indication function. Thus, it is possible to attain further reduction of noise generated by the hard disk drive. Further, the arrangement heretofore attained by two members, that is, a vibration damping steel sheet and a pressure-sensitive adhesive label can be attained by one and the same member. Alternatively, not only a function of reducing driving noise but also a function of indicating information can be added to the HDD pressure-sensitive adhesive label which heretofore has had only the airtightness keeping function in which airtightness is kept by closing the bores (holes).

In an embodiment of the HDD pressure-sensitive adhesive label 1 according to the invention, the pressure-sensitive adhesive layer of the HDD pressure-sensitive adhesive label 1 is coated with a release liner having an antistatic function. Here, "the release liner has an antistatic function" means that the voltage level caused by peeling electrification generated when the release liner is released is small enough not to damage a hard disk drive due to the peeling electrification. More specifically, the surface potential (absolute value) in the surface (mold-release-treated layer side surface) of the release liner when the release liner is released from the HDD pressure-sensitive adhesive label is, for example, approximately not higher than 50 V (0–50 V), preferably not higher than 40 V, more preferably not higher than 30 V.

In another embodiment of the HDD pressure-sensitive adhesive label 1 according to the invention, a function of reducing the adhesive force by heating is provided. Here, "the pressure-sensitive adhesive layer of the HDD pressure-sensitive adhesive label has a function of reducing the adhesive force by heating" means that, when the HDD pressure-sensitive adhesive label stuck on a hard disk drive is heated, the adhesive force due to the pressure-sensitive adhesive layer of the HDD pressure-sensitive adhesive label becomes so low that the HDD pressure-sensitive adhesive label can be peeled from the hard disk drive easily. More specifically, it means that the adhesive force of the pressure-sensitive adhesive layer of the HDD pressure-sensitive adhesive label after heating is reduced to be approximately not higher than 50% (for example, 0–50%) of the adhesive force of one and the same pressure-sensitive adhesive layer before heating, preferably 0–30% thereof, more preferably 0–10% thereof.

Figure 3:
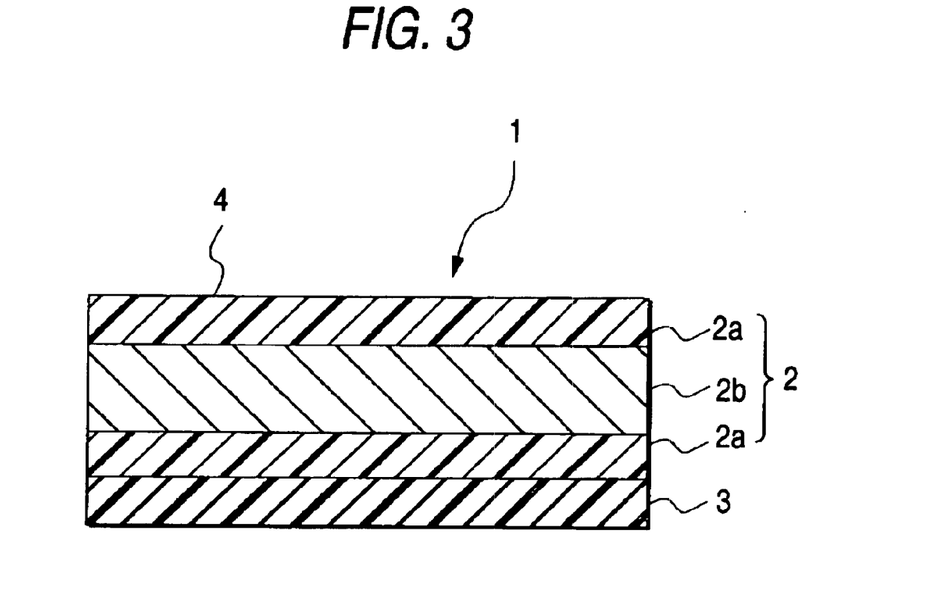
FIG. 3 is a schematic sectional view showing an embodiment of a base of a pressure-sensitive adhesive label for a hard disk drive according to the invention.

The specific structure of the HDD pressure-sensitive adhesive label according to the invention is not limited particularly if the HDD pressure-sensitive adhesive label has these functions and the specific structure of a release liner. For example, a pressure-sensitive adhesive label as shown in also FIG. 3 can be used preferably. In FIG. 3, the reference numeral 2a represents a resin film layer in a base 2; and 2b, metal foil in the base 2. Correspondingly to FIG. 1, the reference numeral 1 represents a pressure-sensitive adhesive label for a hard disk drive (HDD pressure-sensitive adhesive label); 2, a base; 3, a pressure-sensitive adhesive layer; and 4, an information indication portion. In the HDD pressure-sensitive adhesive label 1 according to FIG. 3, the information indication portion 4 is formed on one surface (back side) of the base (laminated base) 2 formed as the base 2 by at least three layers in which the resin film layer 2a is laminated on each of the opposite sides of the metal foil 2b, while the pressure-sensitive adhesive layer 3 is formed on the other surface of the base 2.

The HDD pressure-sensitive adhesive label 1 preferably has a surface density of not lower than 0.18 (kg/m$^2$). When the surface density is not lower than 0.18 (kg/m$^2$), the driving noise can be reduced on a larger scale. More specifically, the surface density of the HDD pressure-sensitive adhesive label can be, for example, selected from the range of not lower than 0.18 (kg/m$^2$), preferably not lower than 0.20 (kg/m$^2$), more preferably not lower than 0.40 (kg/m$^2$).

Incidentally, the upper limit of the surface density of the HDD pressure-sensitive adhesive label is not placed specifically if it is not lower than 0.18 (kg/m$^2$). However, when the surface density increases to some extent, the function of reduction in driving noise is saturated. Thus, in consideration of the function of reduction in driving noise, the cost, and the workability of sticking, the upper limit of the surface density of the HDD pressure-sensitive adhesive label can be, for example, selected from the range of not higher than 1.0 (kg/m$^2$), preferably not higher than 0.80 (kg/m$^2$), more preferably not higher than 0.75 (kg/m$^2$).

In the invention, the surface density of the pressure-sensitive adhesive label (pressure-sensitive adhesive label constituted by a base and a pressure-sensitive adhesive layer) can be, for example, calculated as the total sum of values of density multiplied by thickness in the respective layers. Accordingly, in the invention, the surface density of the pressure-sensitive adhesive label can be controlled by adjusting the density (material) or thickness of the base or the density (material) or thickness of the pressure-sensitive adhesive layer.

Not to say, the surface density of the pressure-sensitive adhesive label can be also calculated by dividing the weight (total weight) of the pressure-sensitive adhesive label (pressure-sensitive adhesive label constituted by a base and a pressure-sensitive adhesive layer) by the area of the pressure-sensitive adhesive layer side surface of the pressure-sensitive adhesive label.

Incidentally, in the invention, the surface density of the pressure-sensitive adhesive label means the surface density of the pressure-sensitive adhesive label when it is stuck on a hard disk drive. That is, the pressure-sensitive adhesive label of which the surface density is calculated is a pressure-sensitive adhesive label in a state that the release liner has been released.

The aforementioned antistatic function, function of reducing the adhesive force by heating, a preferable value of the surface density can be optionally imparted to the pressure-sensitive adhesive label in combination or independently.

[Base]

As for the base of the HDD pressure-sensitive adhesive label, according to the invention, it is preferable to use the base (laminated base) 2 constituted by at least three layers in which the resin film layer 2a is laminated on each of the opposite sides of the metal foil 2b as shown in FIG. 3. Here, as the resin film layers 2a, for example, resin films made of polyethylene terephthalate (PET), polybutylene terephthalate (PBT), polyimide (PI), polyethylene (PE), and polypropylene (PP) may be used. Of them, polyethylene terephthalate is particularly preferable from the point of view of economy and durability. On the other hand, as the metal foil 2b, metal foils such as aluminum foil, iron foil, stainless steel foil, nickel foil, and copper foil may be used. Of them, aluminum foil is particularly preferable from the point of view of process ability and economy.

To provide rigidity enough to exert a vibration damping property and satisfy workability in sticking as a pressure-sensitive adhesive label, the pressure-sensitive adhesive label according to the invention can be formed so that the resin film layer, the metal foil layer and the resin film layer have the following thicknesses and structures respectively by way of example.
(1) The resin film layer on the back side of the pressure-sensitive adhesive label in which the information indication portion will be formed is normally not thinner than 6 $\mu$m and not thicker than 125 $\mu$m (6 $\mu$m to 125 $\mu$m), preferably not thinner than 25 $\mu$m and not thicker than 125 $\mu$m (25 $\mu$m to 125 $\mu$m). When the resin film layer in question is thinner than 6 $\mu$m, the whole of the base is dominated by the properties of the metal foil so as to be wrinkled easily. In addition, the resin film layer is so thin that it becomes very difficult to laminate the resin film layer stably.

In addition, when the resin film layer in question is made not thinner than 25 $\mu$m, a problem of a failure in printing can be further improved in the case where the information indication portion is formed on the resin film layer surface, that is, on the back side of the pressure-sensitive adhesive label, by a thermal transfer type printing apparatus. It can be considered that such a problem is caused by scattering and losing the heat for ink transfer through the metal foil.

Incidentally, when bar codes or the like are printed as the information indication portion, and particularly a resin film colored in white or the like (for example, a white polyethylene terephthalate film) is used as the resin film layer in question, a property superior in readability of bar codes or the like can be obtained.
(2) From the point of view of keeping rigidity as the base, it is desired that the metal foil is not thinner than 5 $\mu$m (preferably 5–250 $\mu$m). When the metal foil is thinner than 5 $\mu$m, there may be a case where the aimed enhancement of rigidity cannot be attained in the base. To enhance the rigidity of the base, the thicker the base is, the better it is. However, when the base is too thick, the pressure-sensitive adhesive label becomes so thick as to affect the product thickness of the hard disk drive. It is therefore desired that the metal foil is not thicker than 250 $\mu$m.
(3) The resin film layer on the side where the pressure-sensitive adhesive layer will be formed is laminated chiefly to suppress the curling of the pressure-sensitive adhesive label. In order to reduce the total thickness of the pressure-sensitive adhesive label, it is preferable that the resin film layer is as thin as possible while achieving the balance with the thickness of the metal foil layer. The thickness is normally selected to be in a range of from 6 $\mu$m to 200 $\mu$m (preferably 25–150 $\mu$m).

The base can be produced by laminating the metal foil and the resin film layers, for example, by use of a known laminating apparatus of a dry laminating system.

Further, one or both of the resin films of the base may be surface-treated by use of a known process such as corona treatment or adhesion promoting treatment so as to improve the printing property and the anchor property of the pressure-sensitive adhesive.

According to the invention, the base may be, for example, formed out of only metal foil, or constituted by a laminate in which two layers of metal foil and a resin film layer are laminated on each other. When the base is formed out of only metal foil, the thickness of the metal foil may be not smaller than 5 $\mu$m. Preferably, the thickness is selected from the range of approximately 100–200 $\mu$m. On the other hand, when the base is constituted by two layers of metal foil and a resin film layer, the thickness of the metal foil may be not smaller than 5 $\mu$m. Preferably, the metal foil is made thin to be in the range of approximately 5–50 $\mu$m. On the other hand, it is preferable that the thickness of the resin film layer is selected from the range of approximately 50–200 $\mu$m.
[Information Indication Portion]

The information indication portion 4 is formed on one surface (back side) of the base (such as a laminated base in which the resin film layers 2a have been laminated on the opposite sides of the metal foil 2b) of the HDD pressure-sensitive adhesive label. In this information indication portion, for example, "instructions for use", "connection method", and "recognition/identification such as product name or manufacturer name" may be formed by a normal printing apparatus.

Incidentally, the information indication portion 4 may be provided in accordance with necessity. For example, when the HDD pressure-sensitive adhesive label is required to have the function of keeping airtightness and the function of reducing driving noise, the information indication portion may be either provided or not provided.

[Pressure-sensitive Adhesive Layer]

In the HDD pressure-sensitive adhesive label 1, the pressure-sensitive adhesive layer 3 is formed on the surface (other surface) of the base (laminated base in FIG. 3) 2 opposite to the surface of the base 2 where the information indication portion 4 is formed. The pressure-sensitive adhesive layer 3 can be formed out of a pressure-sensitive adhesive composition made of a pressure-sensitive adhesive for providing adherence.

A usual or known pressure-sensitive adhesive such as a synthetic rubber based pressure-sensitive adhesive, a natural rubber based pressure-sensitive adhesive or an acrylic based pressure-sensitive adhesive can be used selectively and appropriately as the pressure-sensitive adhesive in the pressure-sensitive adhesive composition forming the pressure-sensitive adhesive layer 3. Each of such pressure-sensitive adhesives may be used alone. Alternatively, two or more kinds of the pressure-sensitive adhesives may be used in combination.

As the pressure-sensitive adhesive, the acrylic-based pressure-sensitive adhesive is preferable from the point of view of durability. More specifically, a pressure-sensitive adhesive composed of a polymer (base polymer) having, as its main component, (meth)acrylate with an alkyl group having a carbon number of 4–14, is desired. Here, alkyl ester of (meth)acrylate with an alkyl group such as a butyl group, a 2-ethylhexyl group, an octyl group, an isononyl group, a hexyl group, an isoamyl group, a lauryl group, or an isomyristyl group can be mentioned as the (meth) acrylate with an alkyl group having a carbon number of 4–14.

Particularly according to the invention, an acrylic-based pressure-sensitive adhesive composed of a polymer having, as its copolymer components, acrylic acid and (meth) acrylate with an alkyl group having a carbon number of 7–10, can be used preferably as the acrylic-based pressure-sensitive adhesive. In the range of the carbon number of 7–10, the glass transition temperature of the pressure-sensitive adhesive greatly contributing to the vibration damping performance is easily achieved simultaneously with the adhesive property.

The vibration damping performance of the pressure-sensitive adhesive layer is greatly influenced by the glass transition temperature of the pressure-sensitive adhesive. To exert the properties of the pressure-sensitive adhesive layer effectively in the working temperature (specifically the working temperature of the hard disk drive, which is normally not lower than the room temperature), it is desired that the loss coefficient of the pressure-sensitive adhesive forming the pressure-sensitive adhesive layer is not lower than 0.5 and not higher than 2.0 (0.5–2.0) at 20° C., preferably not lower than 0.7 and not higher than 2.0 (0.7–2.0). In addition, it is preferable that the peak temperature of the loss coefficient of the pressure-sensitive adhesive is not lower than $-10°$ C. and not higher than 50° C. When the loss coefficient and/or the loss coefficient peak of the pressure-sensitive adhesive are set in the ranges, the vibration damping performance and the adhesive property of the pressure-sensitive adhesive can be achieved simultaneously on an excellent level.

The thickness of the pressure-sensitive adhesive layer is not limited particularly. However, from the point of view of effect on reduction in driving noise, the thickness is set to be not smaller than 15 $\mu$m. In addition, from the point of view of sealing proper ties or adhesive properties, the thickness of the pressure-sensitive adhesive layer may be not smaller than 20 $\mu$m, preferably in the range of approximately 50–350 $\mu$m. Accordingly, in the invention, it is preferable that the thickness of the pressure-sensitive adhesive layer is, for example, selected from the range of 20–100 $\mu$m.

Further, the pressure-sensitive adhesive layer 3 can also be formed out of a pressure-sensitive adhesive composition having a function of reducing the adhesive force by heating. As such a pressure-sensitive adhesive composition, it is possible to use a composition containing a pressure-sensitive adhesive for providing adherence and a thermo-foamable agent capable of being foamed by heating. When a thermo-foamable agent is contained in the pressure-sensitive adhesive layer in such a manner, the bonding area between the pressure-sensitive adhesive layer and a subject to be bonded (hard disk drive) can be reduced by heating at least the pressure-sensitive adhesive layer of the HDD pressure-sensitive adhesive label to thereby foam and/or expand the thermo-foamable agent in order to peel the HDD pressure-sensitive adhesive label stuck on the hard disk drive. Thus, the HDD pressure-sensitive adhesive label can be peeled easily.

The thermo-foamable agent is not limited particularly. Any material may be used if it can be foamed by heating. Preferably, thermo-expandable microspheres can be used. The thermo-expandable microspheres have thermal expansivity to be foamed and/or expanded by heating. One kind of thermo-expandable microspheres may be used alone. Alternatively, two or more kinds of thermo-expandable microspheres may be used in combination.

As the thermo-expandable microspheres, suitable ones can be selected from usual or known thermo-expandable microspheres. For example, microspheres (microcapsules) in each of which a material to be gasified and expanded easily by heating, such as low-boiling-point hydrocarbon (isobutane, propane, pentane, etc.) has been encapsulated in a shell having elasticity can be used as the thermo-expandable microspheres. The shell is often formed out of a thermo-fusible material or a material to be destructed by thermal expansion. Examples of materials for forming the shell include vinylidene chloride-acrylonitrile copolymer, polyvinyl alcohol, polyvinyl butyral, polymethylmethacrylate, polyacrylonitrile, polyvinylidene chloride, and polysulfone. The thermo-expandable microspheres can be produced by a usual method such as a coacervation method, an interfacial polymerization method or an in-situ polymerization method. Incidentally, there are also commercially available microspheres, such as Matsumoto Microsphere [trade name, made by Matsumoto Yushi-Seiyaku Co., Ltd.].

According to the invention, in order to lower the adhesive force of the pressure-sensitive adhesive layer efficiently by heating treatment, it is preferable that the thermo-expandable microspheres have appropriate strength enough not to be ruptured until the volume expansion ratio reaches 5 or more times, particularly 7 or more times, more particularly 10 or more times.

The average particle size of the thermo-expandable microspheres is not limited particularly. For example, the average particle size of the thermo-expandable microspheres can be selected from the range of approximately 1–30 μm.

The loading of the thermo-expandable microspheres can be set suitably in accordance with the reduction property of the expansion ratio or adhesive force of the pressure-sensitive adhesive layer. For example, the loading of the thermo-expandable microspheres is approximately 10–200 parts by weight, preferably 20–125 parts by weight, more preferably 25–100 parts by weight, with respect to 100 parts by weight of the pressure-sensitive adhesive in the pressure-sensitive adhesive layer or a base polymer in the pressure-sensitive adhesive.

[Release Liner]

In the HDD pressure-sensitive adhesive label according to the invention, a release liner is used for protecting the pressure-sensitive adhesive layer until the pressure-sensitive adhesive layer is used. The release liner preferably has an antistatic function. For example, the release liner having such an antistatic function may have a structure in which an antistatic agent has been incorporated (dispersed) in a base of the release liner, or may have a structure in which a base and an antistatic-treated layer have been laminated. According to the invention, a release liner having a structure in which an antistatic-treated layer has been formed on at least one surface of a base can be preferably used as the release liner having an antistatic function. More specifically, examples of the release liner having an antistatic function may include a three-layer laminate structure of a base 5b (linear base), an antistatic-treated layer 5c and a base 5d (linear base), while a mold-release-treated layer 5a is provided on the surface of one of the bases, as shown in FIG. 1; a structure in which an antistatic-treated layer 51b is formed on one surface of a base 51c (liner base), while a mold-release-treated layer 51a is further formed on the surface of the antistatic-treated layer 51b opposite to another surface of the antistatic-treated layer 51b where the base 51c is formed, as shown in FIG. 4; and a structure in which an antistatic-treated layer 52c is formed on one surface of a base 52b (liner base), while a mold-release-treated layer 52a is formed on the opposite surface of the base 52b, as shown in FIG. 5.

Figure 4:
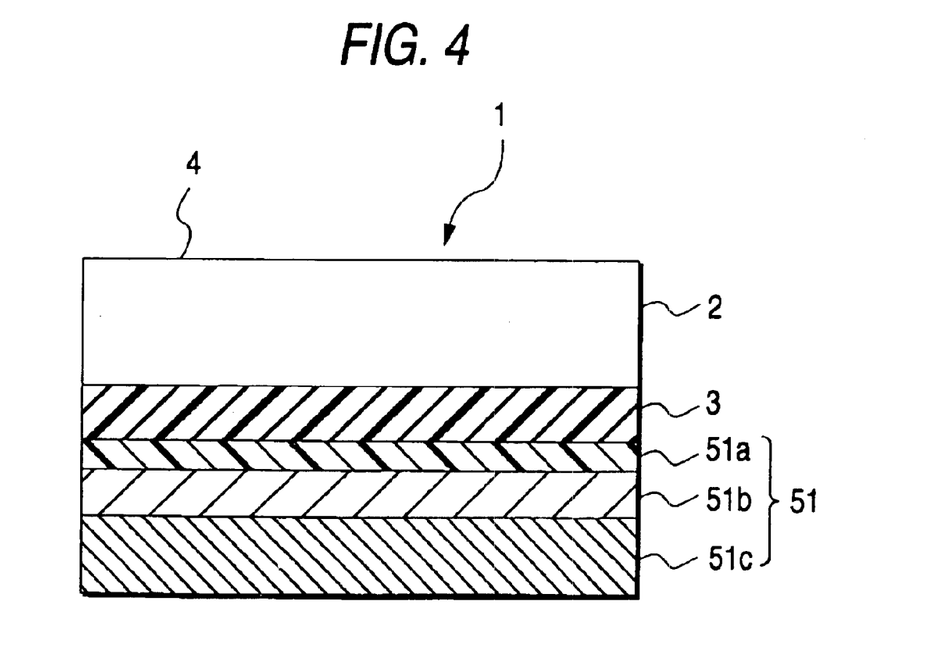
FIG. 4 is a schematic sectional view showing another embodiment of a pressure-sensitive adhesive label for a hard disk drive according to the invention.
Figure 5:
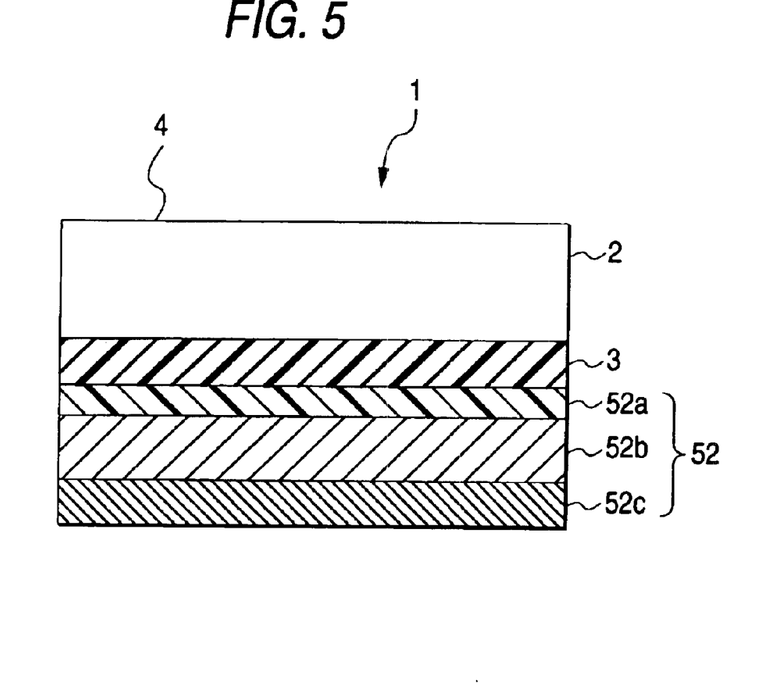
FIG. 5 is a schematic sectional view showing still another embodiment of a pressure-sensitive adhesive label for a hard disk drive according to the invention.

As shown in FIGS. 1, 4 and 5, the antistatic-treated layer may be formed between a plurality of bases or may be formed on one surface of one base. Further, a plurality of antistatic-treated layers may be provided. In such a case, for example, the antistatic-treated layers can be formed on the opposite sides of a base.

As for the base of the release liner, films of various resins (for example, polyester such as polyethylene terephthalate; polyimide; polyolefin such as polypropylene or polyethylene; and polycarbonate) can be used preferably. Of them, the polyethylene terephthalate film is preferable as the base of the release liner from the point of view of punching process ability, low deformation against the tension when the pressure-sensitive adhesive label is worked, and so on.

The antistatic-treated layer in the release liner is not limited particularly if it has an antistatic function. For example, the antistatic-treated layer may be constituted by metal foil or a metal-vapor-deposited film, or may be formed out of an antistatic agent. Incidentally, in the case for metal foil or the metal-vapor-deposited film, the amount of impurities such as impurity ions can be designed and adjusted to be very small by contamination management of raw materials of the metal foil or the metal-vapor-deposited film. Thus, in the invention, an antistatic-treated layer composed of metal foil or a metal-vapor-deposited film can be used preferably.

Metal material in the metal foil or the metal-vapor-deposited film is not limited particularly. Examples of such a metal material include metals such as aluminum, nickel, SUS stainless steel, copper, gold, silver, iron, chromium, cobalt, antimony, molybdenum, and platinum, or alloys of these metals. These metals may be used in the form of foil or in the form of fine powder or fiber. When the antistatic-treated layer is made of metal foil, the antistatic-treated layer can be formed by laminating a foil-like piece of such metal on at least one surface of a base. On the other hand, when the antistatic-treated layer is made of a metal-vapor-deposited film, the antistatic-treated layer can be produced by forming a vapor deposited film out of fine powder or fibrous matters of such metal on at least one surface of a base in a usual deposition method such as a vacuum deposition method.

In addition, the antistatic agent is not limited particularly. Usual antistatic agents may be used. Examples of the usual antistatic agents include surfactants such as cation-based antistatic agents (quaternary ammonium salt type, phosphonium salt type, sulfonium salt type, etc.), anion-based antistatic agents (carboxylic acid type, sulfonate type, sulfate type, phosphate type, etc.), amphoteric-ion-based antistatic agents (sulfobetaine type, alkylbetaine type, alkyl imidazoliumbetaine type, etc.), noion-based antistatic agents (polyalcohol derivatives, β-cyclodextrin inclusion compounds, sorbitan fatty acid monoester-diesters, polyalkylene oxide derivatives, amine oxide derivatives, etc.); polymers having ionic conductivity, such as homopolymers of monomers having ionic conductive groups (cation type such as quaternary ammonium salts, amphoteric ion type such as betaine compounds, anion type such as sulfonates, nonion type such as glycerol, etc.), copolymers of such monomers and other copolymerizable monomers, or copolymers having sites derived from (meth)acrylate with a quaternary ammonium salt group; permanent antistatic agents of the type in which a hydrophilic polymer (such as ethylene-methacrylate copolymer) has been alloyed with acrylic-based resin; and conductive fillers such as acetylene black, Ketjenblack, natural graphite, artificial graphite, titaniumblack, zincoxide, tin oxide, tin-coated titanium oxide, nickel flake, phosphorus-doped tin oxide, and antimony-doped tin oxide. The antistatic-treated layer made of the antistatic agent can be formed in a usual method such as application of the antistatic agent.

The thickness of the antistatic-treated layer is not limited particularly. For example, the thickness can be selected from the range of approximately 0.01–2 μm, preferably 0.04–1 μm.

The mold-release-treated layer can be formed out of a mold release agent or low-adherent polyolefin-based resin. As the mold release agent, a known mold release agent such as a silicone-based mold release agent, an alkylate-based mold release agent or a fluorine-based mold release agent may be used selectively and appropriately. On the other hand, examples of the low-adherent polyolefin-based resin include high-density polyethylene, low-density polyethylene, linear low-density polyethylene, polypropylene, and poly-4-methylpentene-1. Of them, low-density polyethylene and linear low-density polyethylene are preferable. As the linear low-density polyethylene, for example, ethylene-based copolymer in which a small amount of α-olefin (propylene, butene-1, hexene-1, 4-methyl-pentene-1, octene-1, or the like) has been copolymerized with ethylene can be mentioned. Such low-density polyethylene or linear low-density polyethylene can be obtained easily on the basis of a known method and by appropriately selecting the polymerizing reaction conditions and other conditions of purification, fractionation or the like after the polymerizing reaction.

According to the invention, the mold-release-treated layer is not essential. For example, when the base of the release liner is composed of a low-adherent polyolefin-based film, the release function of the base itself can be used so that the release-treated layer can be omitted.

On the other hand, examples of plastic materials for the plastic film itself having high releasability include high-density polyethylene, low-density polyethylene, linear low-density polyethylene, polypropylene, and poly-4-methylpentene-1. Of them, low-density polyethylene and linear low-density polyethylene are preferable. An example of the low-density polyethylene is an ethylene-based copolymer (ethylene-α-olefin copolymer) in which a small amount of α-olefin (propylene, butene-1, hexene-1, 4-methyl-pentene-1, octene-1, or the like) has been copolymerized with ethylene.

As for the release liner according to the invention, in order to prevent a defect such as a failure in contacts due to a silicone component in a precision electronic apparatus such as a hard disk drive, it is preferable to use a release liner having a low content of a silicone component transferred (migrated) to the surface of the pressure-sensitive adhesive layer, particularly a release liner using a silicone-free release agent as its mold release agent (release agent). Examples of such a release liner using a silicone-free release agent as its release agent include a release liner in which a release-treated layer (mold-release-treated layer) composed of not a silicone-based release agent but a release agent such as a fluorine-based release agent or a long chain alkyl-based release agent has been formed on the surface of a substrate (base); and a plastic film having high releasability in itself, such as a polyethylene film (low density polyethylene film, etc.) or an ethylene-α-olefin copolymer film.

The thickness of the base of the release liner is not limited particularly. For example, the thickness may be selected from the range of approximately 5–300 μm, preferably 10–200 μm.

The thickness of the mold-release-treated layer is not limited particularly. For example, the thickness may be selected from the range of approximately 5–100 μm, preferably 10–50 μm.

The total thickness of the release liner is not limited particularly. For example, the thickness may be selected from the range of approximately 30–200 μm, preferably 50–100 μm.

Incidentally, when a release liner having a low content of a silicone component transferred (migrated) to the surface of the pressure-sensitive adhesive layer or a release liner using a silicone-free release agent as its release agent is used, there is a tendency that the peeling strength generally becomes larger than that of a release liner using a silicone-based release agent. As a result, when the HDD pressure-sensitive adhesive label according to the invention is released from the release liner, the HDD pressure-sensitive adhesive label may be curled. For this reason, it is preferable that a laminated base constituted by at least three layers in which a resin film layer is laminated on each of opposite sides of metal foil is used as the base of the HDD pressure-sensitive adhesive label. When an HDD pressure-sensitive adhesive label using a base formed thus is combined with a release liner using a silicone-free release agent as its release agent, it is possible to prevent curling from being generated when the HDD pressure-sensitive adhesive label is released from the release liner in order to use the HDD pressure-sensitive adhesive label. Thus, the workability in sticking the HDD pressure-sensitive adhesive label subsequently to the release of the release liner is improved.

As described previously, the HDD pressure-sensitive adhesive label according to the invention can be used by partially releasing the release liner and sticking the HDD pressure-sensitive adhesive label onto the outer surface of a top cover and/or a housing body (housing) of a hard disk unit, for example, as shown in FIG. 2. The hard disk unit is constituted by a housing body A receiving recording disks, a magnetic head, a spindle motor, etc., and a top cover B. By the sticking of the HDD pressure-sensitive adhesive label, the driving noise of the hard disk drive can be reduced. In addition, the information indication function can be exerted. According to the invention, the HDD pressure-sensitive adhesive label may be stuck on at least a part of the housing of the hard disk drive. However, in order to exert the better effect of reduction in driving noise, the area where the pressure-sensitive adhesive label is stuck may be increased. It is the most preferable that the HDD pressure-sensitive adhesive label is stuck on the outer surface of the top cover of the hard disk drive so as to cover an area not smaller than 20% of the whole area of the top cover, particularly an area ranging from 25 to 100% thereof.

Incidentally, in order to keep airtightness, the HDD pressure-sensitive adhesive label has to be stuck so as to close bores (holes) formed in the outer surface of the top cover and/or the outer surface of the housing body (housing) of the hard disk unit. It is therefore preferable that the portion where the HDD pressure-sensitive adhesive label is stuck is a portion where the HDD pressure-sensitive adhesive label closes at least the bores formed in the outer surface of the hard disk drive.

According to the invention, a single HDD pressure-sensitive adhesive label or a plurality of HDD pressure-sensitive adhesive labels may be stuck on the outer surface of the hard disk drive. For example, when a plurality of bores are formed in the outer surface of the hard disk drive, (a) a single HDD pressure-sensitive adhesive label may be stuck to close all the bores, or (b) a plurality of HDD pressure-sensitive adhesive labels may be stuck so that each of the HDD pressure-sensitive adhesive label closes one or two or more bores, with the result that all the bores are closed by the HDD pressure-sensitive adhesive labels.

In addition, when the release liner coating the pressure-sensitive adhesive layer is released, generation of static electricity is suppressed or prevented because the release liner has an antistatic function. Accordingly, little or no peeling electrification is generated in the release liner, and further little or no peeling electrification is generated in the pressure-sensitive adhesive label after the release liner is released. That is, when a lease liner having an antistatic function is used as the release liner, it is possible to reduce or eliminate the amount of peeling electrification not only in the release liner but also in the pressure-sensitive adhesive label. Accordingly, even if the pressure-sensitive adhesive label according to the invention is applied to a hard disk drive, there is little or no harmful influence such as breaking down of an apparatus due to static electricity.

In addition, when the pressure-sensitive adhesive layer has a function of reducing the adhesive force by heating, the HDD pressure-sensitive adhesive label stuck on a hard disk drive can be peeled from the hard disk drive after the hard disk drive is heated so that at least the pressure-sensitive adhesive layer of the HDD pressure-sensitive adhesive label is heated. That is, a method for peeling the HDD pressure-sensitive adhesive label from a hard disk drive according to the invention is a method in which the hard disk drive on which the HDD pressure-sensitive adhesive label has been stuck is heated so as to heat at least the pressure-sensitive adhesive layer of the HDD pressure-sensitive adhesive label and thereby peel the HDD pressure-sensitive adhesive label stuck on the hard disk drive from the hard disk drive. As for the method for heating thus, a part of the hard disk drive on which the pressure-sensitive adhesive label has been stuck may be heated so that only the pressure-sensitive adhesive layer of the HDD pressure-sensitive adhesive label is heated. However, for example, the whole surface on the hard disk drive on which the HDD pressure-sensitive adhesive label has been stuck or the whole hard disk drive may be heated so that the pressure-sensitive adhesive layer of the HDD pressure-sensitive adhesive label is heated. More specifically, examples of such a heating method include a method in which hot air is blown directly against a pressure-sensitive adhesive label on a hard disk drive on which the pressure-sensitive adhesive label has been stuck, and a method in which a hard disk drive on which a pressure-sensitive adhesive label has been stuck is placed under a high-temperature atmosphere. Incidentally, it is important that the heating temperature at the time of heating reaches at least a temperature with which the thermo-foamable agent in the pressure-sensitive adhesive layer of the HDD pressure-sensitive adhesive label is foamed and/or expanded.

Further, a cut line may be provided in the release liner adapted to the pressure-sensitive adhesive label 1. By use of the release liner having a cut line, the release liner can be released from the pressure-sensitive adhesive layer easily without causing damage such as curling or wrinkles to the pressure-sensitive adhesive label. More specifically, the release liner is released partially from the cut line provided in the release liner so that the force applied to the HDD pressure-sensitive adhesive label when the release liner is released can be reduced. Thus, the release liner can be released from the pressure-sensitive adhesive layer easily without causing damage such as curling or wrinkles to the pressure-sensitive adhesive label.

In addition, the following manner may be taken. That is, the release liner is released partially from the cut line so as to expose the pressure-sensitive adhesive layer partially. Then, the exposed pressure-sensitive adhesive layer is stuck onto the hard disk drive partially. Then, the other portion of the release liner is released to expose the other portion of the pressure-sensitive adhesive layer. Then, the exposed pressure-sensitive adhesive layer is stuck onto the hard disk drive. Thus, the HDD pressure-sensitive adhesive label can be positioned on the hard disk drive easily. It is therefore possible to improve workability in sticking the HDD pressure-sensitive adhesive label.

Figure 6:
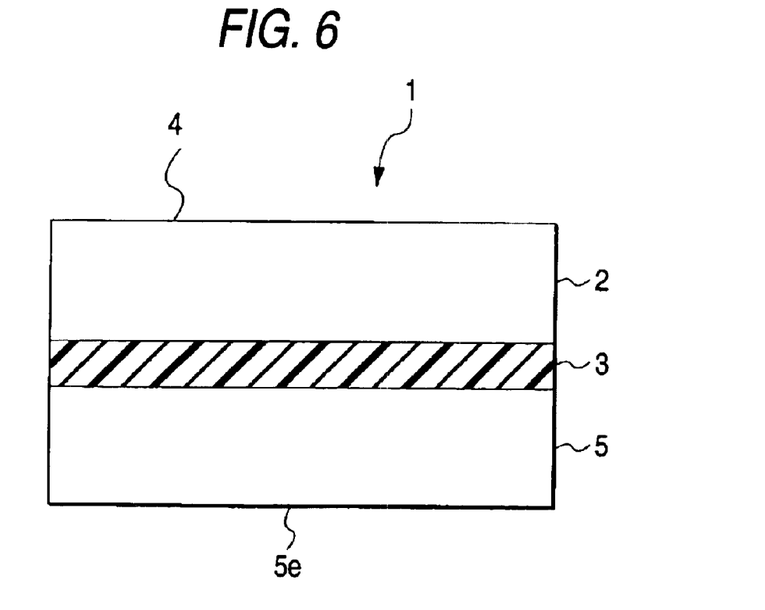
FIG. 6 is a schematic sectional view showing still another embodiment of a pressure-sensitive adhesive label for a hard disk drive according to the invention.
Figure 7:
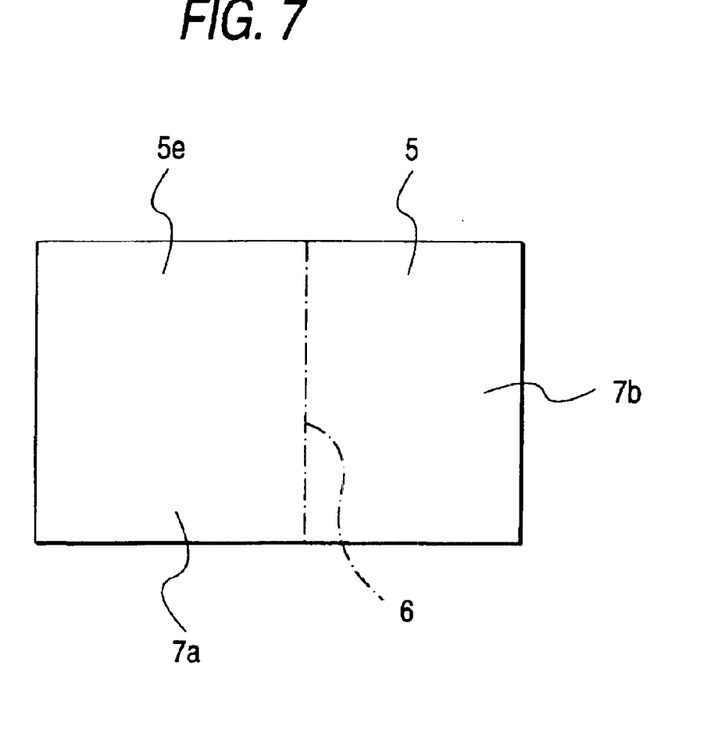
FIG. 7 is a schematic view showing the release liner having a cut line according to FIG. 6.

By way of example, the release liner having a cut line according to the invention may be arranged as shown in FIG. 7. FIG. 7 is a schematic view showing a release liner having a cut line according to FIG. 6. In FIG. 6, correspondingly to those in the above description, the reference numeral 5 represents a release liner; and 5*e* represents a surface (outer surface) of the release liner 5 opposite to the surface of the release liner 5 where a pressure-sensitive adhesive layer 3 is formed. Thus, the release liner having a cut line does not necessarily have a structure shown in FIG. 1. Not to say, it is possible to provide a cut line to the release liners 5, 51 and 52 shown in FIGS. 1, 4 and 5. The reference numeral 6 represents a cut line; 7*a* and 7*b* represent split portions split by the cut line 6 in the release liner 5 respectively. In the release liner 5 according to FIG. 7, the cut line 6 is provided in the outer surface 5*e*. This structure directed to the cut line can be used in combination with the aforementioned anti-static function, function of reducing the adhesive force by heating, a preferable value of the surface density in the release liner optionally.

When the HDD pressure-sensitive adhesive label 1 having the pressure-sensitive adhesive layer 3 coated with the release liner 5 thus is stuck onto a hard disk drive, one of the split portions of the release liner 5 is first released from the cut line 6 so as to expose a portion of the pressure-sensitive adhesive layer which has been coated with the split portion. Then, the portion of the exposed pressure-sensitive adhesive layer 3 in the HDD pressure-sensitive adhesive label 1 is stuck onto a predetermined portion of the hard disk drive. At this time, the pressure-sensitive adhesive layer is coated partially with the other split portion of the release liner so that the portion coated with the other split portion can be held by hand. Thus, the HDD pressure-sensitive adhesive label is retained easily. Further, since the portion partially coated with the release liner can be held by hand, the HDD pressure-sensitive adhesive label can be held without having any hand or any finger directly touch the adhesive surface. Thus, it is possible to suppress or prevent the lowering of the adherence when the HDD pressure-sensitive adhesive label is stuck. In addition, since the portion partially coated with the release liner can be held by hand as described previously, the HDD pressure-sensitive adhesive label can be positioned on the hard disk drive easily. It is therefore possible to improve the workability.

Further, after the exposed portion of the pressure-sensitive adhesive layer 3 in the HDD pressure-sensitive adhesive label 1 is stuck onto a predetermined portion of the hard disk drive, the other split portion of the release liner 5 (which has not yet been released) is released to expose the other portion of the pressure-sensitive adhesive layer coated with the other split portion. Then, the exposed other portion of the pressure-sensitive adhesive layer 3 is stuck onto a predetermined portion of the hard disk drive. Thus, the HDD pressure-sensitive adhesive label 1 can be stuck on the hard disk drive.

Not the say, the HDD pressure-sensitive adhesive label 1 may be positioned in a predetermined place of the hard disk drive so that the release liner 5 touches the hard disk drive while the pressure-sensitive adhesive layer 3 is coated with the release liner 5. In this case, the HDD pressure-sensitive adhesive label 1 is then lifted up to the cut line 6 of the release liner 5 from one end portion of the HDD pressure-sensitive adhesive label 1 (at this time, the other portion of the HDD pressure-sensitive adhesive label 1 can be held down by hand from the base 2 side thereof). Then, the release liner 5 is released partially from the cut line 6 so as to expose the pressure-sensitive adhesive layer 3 partially. The exposed portion of the pressure-sensitive adhesive layer is stuck onto the surface of the hard disk drive. Then, the other end portion of the HDD pressure-sensitive adhesive label 1 is lifted up to the cut line 6 of the release liner 5 (at this time, the stuck portion of the HDD pressure-sensitive adhesive label 1 can be held down by hand from the base 2 side thereof). The release liner 5 is released partially from the cut line 6 so as to expose the pressure-sensitive adhesive layer which has not yet been exposed. The exposed portion of the pressure-sensitive adhesive layer is stuck onto the surface of the hard disk drive. The HDD pressure-sensitive adhesive label 1 may be stuck on the hard disk drive in such a manner.

Figure 8A:
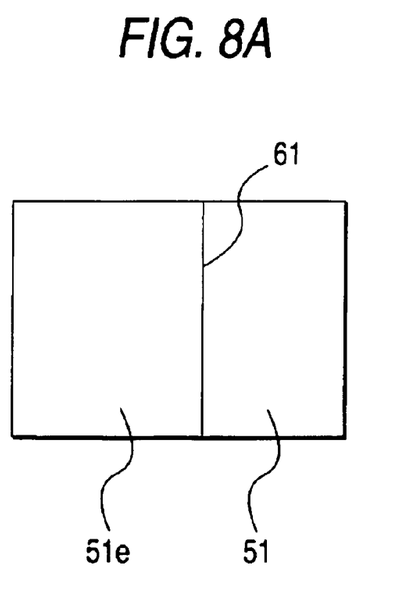
FIGS. 8A and 8B are schematic views showing cut lines of release liners according to the invention, FIG. 8A showing a release liner having a cut line formed into a continuous line, and FIG. 8B showing a release liner having a cut line formed into a perforated line.
Figure 8B:
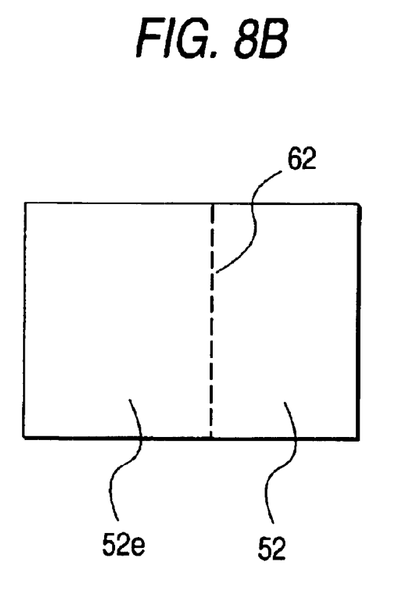

The specific form of the cut line in the release liner is not limited particularly if it is a cutting portion by which the release liner is split into a plurality of portions and can be released when the release liner is released. For example, the cut line may have a cut line form or a perforated line form as shown in FIGS. 8A and 8B. FIGS. 8A and 8B are schematic views showing cut lines of release liners according to the invention. FIG. 8A shows a release liner having a cut line formed into a continuous line. FIG. 8B shows a release liner having a cut line formed into a perforated line. In FIG. 8A, the reference numeral 51 represents a release liner; 51e, an outer surface of the release liner 51; and 61, a cut line formed into a continuous line. In FIG. 8B, the reference numeral 52 represents a release liner; 52e, an outer surface of the release liner 52; and 62, a cut line formed into a perforated line. In FIG. 8A, as the cut line, the cut line 61 formed into a continuous line is provided from one end portion of the release liner 51 to the other end portion thereof. On the other hand, in FIG. 8B, as the cut line, the cut line 62 formed into a perforated line is provided from one end portion of the release liner 52 to the other end portion thereof.

Incidentally, the depth of cutting in the continuous line or the perforated line is not limited particularly. The cutting may be done to be deep enough to split the both sides of the line perfectly. Alternatively, the cutting may be done to be deep enough to split the both sides of the line only in the surface but to allow them to connect with each other in the inside.

The portion where the cut line arranged thus is provided in the release liner is not limited particularly. For example, the cut line may be provided so that the respective split portions split by the cut line have areas equal in size or provided so that the split portions have area different in size. According to the invention, it is preferable that the split portions split by the cut line have different areas. In such a structure, by releasing first the smaller-area one of the split portions split by the cut line, the work of releasing the release liner becomes so easy that the workability can be improved.

When the split portions split by the cut line have different areas in the release liner, the ratio of the respective split portions is not limited particularly. For example, the ratio $A_L/A_S$ of the area ($A_L$) of the split portion having the largest area to the area ($A_S$) of the split portion having the smallest area can be selected from the range of approximately 10/1–1.1/1, preferably 3/1–1.2/1.

In addition, according to the invention, two or more cut lines may be provided in the release liner in order to make the work of releasing the release liner easy.

The cut line of the release liner may be provided in advance before the release liner is applied to the pressure-sensitive adhesive layer of the pressure-sensitive adhesive label, or may be provided after the release liner is applied to the pressure-sensitive adhesive layer of the pressure-sensitive adhesive label.

As aforementioned, when a release liner having a low content of a silicone component transferred (migrated) to the surface of the pressure-sensitive adhesive layer or a release liner using a silicone-free release agent as its release agent is used, there is a tendency that the peeling strength generally becomes larger than that of a release liner using a silicone-based release agent. According to the invention, since a release liner having a cut line may be used as the release liner, the workability in sticking the pressure-sensitive adhesive label is further improved.

The invention will be described more specifically with reference to the following examples. However, the invention is not limited to only the examples.

EXAMPLE 1

The following base A was used as the base.

Base A: A base A constituted by a polyethylene terephthalate film layer (9 μm thick), aluminum foil (30 μm thick), and a polyethylene terephthalate film layer (9 μm thick) was produced by a lamination system using dry lamination bonding.

In addition, the following pressure-sensitive adhesive composition A was used as the pressure-sensitive adhesive.

Pressure-sensitive adhesive Composition A: 15 parts by weight of acrylic acid and 85 parts by weight of isononyl acrylate as compounds, and 0.1 part by weight of "Irgacure 184 (trade name)" made by Ciba Geigy Ltd. as a photopolymerization initiator, were thrown into a three neck flask, and stirred for an hour while nitrogen gas was introduced for nitrogen displacement in the reaction system. After that, the compounds were irradiated with UV light of about 150 mJ by an ultraviolet lamp (UV lamp) so that reaction was carried out at a polymerization rate of about 10%. Thus, a prepolymer was obtained. Further, 0.2 part by weight of trimethylolpropane triacrylate (TMPTA) as an internal cross-linker was added to 100 parts by weight of this prepolymer, and stirred. Thus, a pressure-sensitive adhesive composition A (acrylic-based pressure-sensitive adhesive A) was obtained.

The pressure-sensitive adhesive composition A (acrylic-based pressure-sensitive adhesive A) was applied to one surface of the base A so as to be 25 μm thick. Further, a silicone-based release agent layer side surface of a polyethylene terephthalate film (release liner A1) in which the silicone-based release agent layer had been formed in the surface was stuck on the pressure-sensitive adhesive composition A so as to shield the composition surface from the air layer. In this state, the composition A was irradiated with UV light of about 2,000 mJ from the release liner side by the UV lamp so that the composition was reacted. Thus, an adhesive sheet A1 was obtained. After the release liner A1 was released (or removed) from the adhesive sheet A1, the adhesive sheet A1 was dried for about 1 minute in an oven at 130° C. so that volatile components were removed from the pressure-sensitive adhesive layer composed of the acrylic-based pressure-sensitive adhesive A. A release liner A made of the following constitution was stuck on the adhesive sheet A1 again. Thus, a base-including adhesive sheet A was produced.

Release Liner A: Alaminate having a three-layer structure made of a polyethylene film layer (20 μm thick), an aluminum-vapor-deposited film layer (antistatic-treated layer), and a polyethylene terephthalate film layer (50 μm thick) was produced by a lamination system using dry lamination bonding. Further, a silicone-based mold release agent layer (mold-release-treated layer) (2 μm thick) made of a silicone-based mold release agent (trade name "KS-778" made by Shin-Etsu Chemical Co., Ltd.) was formed on the surface of the polyethylene film layer of the laminate. Thus, a release liner A was produced.

Next, printing was provided on the back side of the base of the base-including adhesive sheet A to produce a pressure-sensitive adhesive layer adhesive A.

Incidentally, the pressure-sensitive adhesive label produced thus was stuck on about 56% of the outer surface of the top cover of a commercially available 2.5-inch hard disk drive, and the noise level was measured by [Noise Level (Driving Noise) Measuring Method] which will be described later. As a result, the noise level which had been 27.7 dB (A)

before the pressure-sensitive adhesive label according to Example 1 was stuck became 25.8 dB (A).

EXAMPLE 2

A pressure-sensitive adhesive label B was produced in the same manner as that in Example 1, except that the following release liner B was used as the release liner of the pressure-sensitive adhesive label.

Release Liner B: A laminate having a two-layer structure made of an aluminum-vapor-deposited film layer (antistatic-treated layer) and a polyethylene terephthalate film layer (50 µm thick) was produced by a lamination system using dry lamination bonding. Further, a silicone-based mold release agent layer (mold-release-treated layer) (2 µm thick) made of a silicone-based mold release agent (trade name "KS-778" made by Shin-Etsu Chemical Co., Ltd.) was formed on the surface of the aluminum-vapor-deposited film layer of the laminate. Thus, a release liner B was produced.

EXAMPLE 3

A pressure-sensitive adhesive label C was produced in the same manner as that in Example 1, except that the following release liner C was used as the release liner of the pressure-sensitive adhesive label.

Release Liner C: A laminate having a three-layer structure made of a polyethylene film layer (20 µm thick), an aluminum-vapor-deposited film layer (antistatic-treated layer) and a polyethylene terephthalate film layer (50 µm thick) was produced by a lamination system using dry lamination bonding. Thus, a release liner C was produced. Incidentally, the surface of the release liner C to be brought into contact with the pressure-sensitive adhesive layer of the pressure-sensitive adhesive label is the polyethylene film layer side surface (mold-release-treated layer).

EXAMPLE 4

A pressure-sensitive adhesive label D was produced in the same manner as that in Example 1, except that the following release liner D was used as the release liner of the pressure-sensitive adhesive label.

Release Liner D: A laminate having a two-layer structure made of an aluminum-vapor-deposited film layer (antistatic-treated layer) and a polyethylene terephthalate film layer (50 µm thick) was produced by a lamination system using dry lamination bonding. Further, a silicone-based mold release agent layer (mold-release-treated layer) (2 µm thick) made of a silicone-based mold release agent (trade name "KS-778" made by Shin-Etsu Chemical Co., Ltd.) was formed on the surface of the polyethylene terephthalate film layer of the laminate. Thus, a release liner D was produced.

COMPARATIVE EXAMPLE 1

A pressure-sensitive adhesive label E was produced in the same manner as that in Example 1, except that the following release liner E was used as the release liner of the pressure-sensitive adhesive label.

Release Liner E: A silicone-based mold release agent layer (mold-release-treated layer) (2 µm thick) made of a silicone-based mold release agent (trade name "KS-778" made by Shin-Etsu Chemical Co., Ltd.) was formed on the surface of a polyethylene terephthalate film layer (50 µm thick). Thus, a release liner E was produced.

Evaluation I

Each of the pressure-sensitive adhesive labels obtained in Examples 1 to 4 and Comparative Example 1 was cut to measure 50 mm in width by 150 mm in length. Under an atmosphere of 25° C. and 65% RH, the release liner coating the pressure-sensitive adhesive layer of the pressure-sensitive adhesive label was released at a rate of 2 m/min, and the amount of peeling electrification (surface potential) (V) on the mold-release-treated layer side surface of the release liner surface at that time was measured by a surface potential measuring apparatus (trade name "ELECTROSTATIC VOLTMETER" made by Trek Japan K.K.). Incidentally, the measured value (V) of the surface potential (amount of peeling electrification in the surface) is an absolute value. The measurement result is shown in Table 1. Incidentally, the height of a probe for measuring the surface potential was set to be 5 mm above the release liner surface (mold-release-treated layer side surface).

TABLE 1

|  | surface potential (V) (absolute value) |
|---|---|
| Example 1 | 20 |
| Example 2 | 10 |
| Example 3 | 10 |
| Example 4 | 30 |
| Comparative Example 1 | 400 |

Further, the noise level was measured in the following method.

<Method for Measuring Noise Level (Driving Noise)>

Power was supplied to the hard disk drive in which each of the pressure-sensitive adhesive labels according to Examples 1 and 2 had been stuck on a top cover, so as to drive the hard disk drive. The noise level at the time of driving (driving noise) was measured in the following method.

The noise level was measured in an anechoic chamber. A test stand was installed in the anechoic chamber, and the hard disk drive as a target to be subjected to noise measurement was installed on high sound-insulating rubber-based foam (20 mm thick) so that the surface of the hard disk drive where the pressure-sensitive adhesive label was stuck looked upward. (The high sound-insulating rubber-based foam was used for preventing the solid borne sound of the test stand caused by the vibration propagation of the hard disk drive, and for insulating noise from the bottom surface of the hard disk drive.

The hard disk drive was driven, and left until the noise level was stable. Then, the noise level was measured by a free-field type microphone installed 300 mm above the central portion. For the measured value, A-scale was adopted as acoustic correction, and processing of averaging for 20 seconds was carried out. Thus, the measured value was expressed as an overall value in the frequency range of 20–20,000 Hz.

As is apparent from Table 1, in each of the pressure-sensitive adhesive labels according to Examples 1 to 4, the amount of peeling electrification generated when the release liner was released was very small to be not higher than 30 V.

On the other hand, the pressure-sensitive adhesive label according to Comparative Example 1 was greatly charged to 400 V when the release liner was released.

Accordingly, when a release liner-including pressure-sensitive adhesive label according to the invention is used, the amount of peeling electrification can be reduced on a large scale so that breaking down of an apparatus such as a hard disk drive caused by static electricity can be suppressed or prevented.

Further, according to each of the pressure-sensitive adhesive labels according to Examples 1 to 4, the driving noise can be reduced by at least 1 dB if the pressure-sensitive adhesive label is stuck on a portion of a currently commercially available hard disk drive where an indication label had been stuck.

EXAMPLE 5

The base A same as in the Example 1 was used as the base.

In addition, the following pressure-sensitive adhesive composition B was used as the pressure-sensitive adhesive.

Pressure-sensitive adhesive Composition B: The composition B was produced according to the same manner as that for the pressure-sensitive adhesive Composition A in the Example 1 except for that 10 parts by weight of acrylic acid and 90 parts by weight of isononyl acrylate as compounds were used.

The pressure-sensitive adhesive composition B (acrylic-based pressure-sensitive adhesive B) was applied to one surface of the base A so as to be 25 µm thick. Further, a silicone-based release agent layer side surface of a polyethylene terephthalate film (release liner A1) in which the silicone-based release agent layer had been formed in the surface was stuck on the pressure-sensitive adhesive composition A, and the composition was reacted under the same condition as in the Example 1 to obtain an adhesive sheet B1. After the release liner A1 was released (or removed) from the adhesive sheet B1, and volatile components were removed from the pressure-sensitive adhesive layer composed of the acrylic-based pressure-sensitive adhesive B under the same condition as in the Example 1. A release liner B made of only a low-density polyethylene film was stuck on the adhesive sheet A1 again. Thus, a base-including adhesive sheet B was produced.

Printing was provided on the back side of the base of the base-including adhesive sheet B. After that, a cut line having a cut line form was formed as the cut line in the adhesive sheet B as shown in FIG. 8A. Thus, an adhesive sheet in which the pressure-sensitive adhesive layer was coated with a release liner having a cut line was produced.

Incidentally, the pressure-sensitive adhesive label produced thus was stuck on about 56% of the outer surface of the top cover of a commercially available 2.5-inch hard disk drive, and the noise level was measured by the same manner for the Example 1. As a result, the noise level which had been 27.7 dB (A) before the pressure-sensitive adhesive label according to Example 5 as stuck became 26.0 dB (A).

EXAMPLE 6

An adhesive sheet in which a pressure-sensitive adhesive layer was coated with a release liner having a cut line was produced in the same manner as that in Example 5 except that a cut line was formed into a perforated line as the cut line in the release liner of the pressure-sensitive adhesive label as shown in FIG. 8B.

COMPARATIVE EXAMPLE 2

An adhesive sheet in which a pressure-sensitive adhesive layer was coated with a release liner (release liner having no cut line) was produced in the same manner as that in Example 5, except that no cut line was formed.

Evaluation II

Upon each of the pressure-sensitive adhesive labels obtained in Examples 5 and 6 and Comparative Example 2, the state (state after release) of the base of the pressure-sensitive adhesive label when the release liner had been released from the pressure-sensitive adhesive label and the workability in sticking the pressure-sensitive adhesive label onto a hard disk drive were evaluated. The results of the evaluations are shown in Table 2.

As the state (state after release) of the base of the pressure-sensitive adhesive label when the release liner had been released from the pressure-sensitive adhesive label, it was examined chiefly whether the pressure-sensitive adhesive label was curled or not. When the pressure-sensitive adhesive label was curled, the degree of curling was examined. On the other hand, as the workability in sticking the pressure-sensitive adhesive label onto a hard disk drive, it was examined whether the pressure-sensitive adhesive label could be stuck easily. The symbol "o" was given when the pressure-sensitive adhesive label could be stuck easily and the workability was high, while the symbol "x" was given when the pressure-sensitive adhesive label was difficult to be stuck and the workability was low. The results are shown in Table 2.

Incidentally, when the release liner was released from each of the pressure-sensitive adhesive labels according to Examples 5 and 6, the release liner was released by use of the cut line. In addition, when the workability in sticking was examined, each of the pressure-sensitive adhesive labels according to Examples 5 and 6 was stuck in the following method. That is, one portion of the release liner was released from the cut line so as to expose the pressure-sensitive adhesive layer. The exposed pressure-sensitive adhesive layer in the portion where the release liner had been released was stuck while the other portion where the release liner had not yet been released was held by hand. After that, the other portion of the release liner was released, and the newly exposed portion of the pressure-sensitive adhesive layer was stuck.

TABLE 2

| | state after release | workability |
| --- | --- | --- |
| Example 5 | Curled, but the degree was small. | o |
| Example 6 | Curled, but the degree was small. | o |
| Comparative Example 2 | Curled significantly, and the degree was large. | x |

As is apparent from Table 2, as for each of the pressure-sensitive adhesive labels according to Examples 5 and 6, there is little curling of the pressure-sensitive adhesive label which may appear when the release liner is released. Further, the pressure-sensitive adhesive label is stuck onto a hard disk drive easily so that the workability is excellent.

On the other hand, as for the pressure-sensitive adhesive label according to Comparative Example 2, the pressure-sensitive adhesive label is curled when the release liner is released. In addition, it is difficult to stick the pressure-sensitive adhesive label onto a hard disk drive so that the workability is low.

Accordingly, when the release liner-including pressure-sensitive adhesive label according to the invention is used, the release liner can be released without causing little or no damage to the pressure-sensitive adhesive label. In addition, it is easy to stick the pressure-sensitive adhesive label onto a hard disk drive. Thus, the workability can be improved.

Further, by use of the pressure-sensitive adhesive label according to each of Examples 5 and 6, the driving noise can be reduced by at least 1 dB if the pressure-sensitive adhesive label is stuck on a portion of a currently commercially available hard disk where an indication label had been stuck.

EXAMPLE 7

The following base C was used as the base.

Base C: A base C constituted by a polyethylene terephthalate film layer (9 µm thick), aluminum foil (50 µm thick), and a polyethylene terephthalate film layer (9 µm thick) was produced by a lamination system using dry lamination bonding.

In addition, the following pressure-sensitive adhesive composition C was used as the pressure-sensitive adhesive.

Pressure-sensitive adhesive Composition C: 10 parts by weight of acrylic acid and 90 parts by weight of 2-ethylhexyl acrylate as compounds, 0.1 part by weight of azobisisobutyronitrile as a polymerization initiator, and 150 parts by weight of toluene as a polymerization solvent were thrown into a three neck flask, and stirred for an hour while nitrogen gas was introduced. Thus, nitrogen displacement was carried out in the polymerization system. After that, the temperature was increased to 60° C. so that polymerization reaction was carried out for 7 hours. The weight average molecular weight of an obtained polymer was about 1,000,000. Then, 2.7 parts by weight of an isocyanate-based cross-linker (trade name: Coronate L, made by Nippon Polyurethane Industry Co., Ltd.) were added as a cross-linker to 100 parts by weight of this polymer (base polymer) as solid content, and then stirred sufficiently. Thus, an acrylic-based pressure-sensitive adhesive A was prepared. Further, 30 parts by weight of thermo-expandable microspheres (trade name: Matsumoto Microsphere F-50D, made by Matsumoto Yushi-Seiyaku Co., Ltd.) were added to 100 parts by weight of the base polymer of the acrylic-based pressure-sensitive adhesive C, and stirred sufficiently. Thus, an pressure-sensitive adhesive compound (pressure-sensitive adhesive composition) C was prepared.

The pressure-sensitive adhesive composition C was applied to one surface of the base C so as to be 50 µm thick, and heated in an oven at 70° C. for 5 minutes. Thus, a pressure-sensitive adhesive layer was formed. Further, a release liner composed of only a low-density polyethylene. (LDPE) film subjected to no treatment with a silicone-based release agent was stuck on the pressure-sensitive adhesive layer side surface. Thus, a base-including adhesive sheet (pressure-sensitive adhesive label) was produced.

Incidentally, the pressure-sensitive adhesive label produced thus was stuck onto about 60% of the outer surface of the top cover of a commercially available 2.5-inch hard disk drive, and the noise level was measured by the same manner for the Example 1. As a result, the noise level which had been 46.6 dB (A) before the pressure-sensitive adhesive label according to Example 1 was stuck became 45.2 dB (A).

COMPARATIVE EXAMPLE 3

A base-including adhesive sheet (pressure-sensitive adhesive label) was produced in the same manner as that in Example 7, except that an pressure-sensitive adhesive compound (pressure-sensitive adhesive composition) C composed of only the acrylic-based pressure-sensitive adhesive C (that is, without addition of any thermo-expandable microspheres) was used as the pressure-sensitive adhesive compound.
Evaluation III Each of the pressure-sensitive adhesive labels obtained in Example 7 and Comparative Example 3 was cut into the same shape as that of an indication label stuck in advance on the outer surface of the housing of a commercially available 2.5-inch hard disk drive. Next, the indication label stuck in advance was peeled from the commercially available 2.5-inch hard disk drive, and each of the pressure-sensitive adhesive labels according to Example 7 and Comparative Example 3 cut into the same shape was stuck on the same place where the indication label had been stuck.

Each of the hard disk drives on which the pressure-sensitive adhesive labels according to Example 7 and Comparative Example 3 were stuck was subjected to heating treatment for 10 minutes in a hot air dryer set at 130° C. The peel strengths before and after the heating were measured by measuring the adhesive force before and after the heating in the following method for measuring peel strength. Then, the releasability was evaluated. Incidentally, the result of the measurement and the evaluation of releasability are shown in Table 3.

Method for Measuring Peel Strength

In each of the hard disk drives on which the pressure-sensitive adhesive labels according to Example 7 and Comparative Example 3 were stuck, the pressure-sensitive adhesive label in the portion where the pressure-sensitive adhesive label was stuck uniformly was cut to be 10 mm wide. The 180° peel adhesive strength (peeling rate 300 mm/min, 23° C.) was measured. Upon each of the pressure-sensitive adhesive labels according to Example 7 and Comparative Example 3, the 180° peel adhesive strength was measured before heating and after heating treatment for 10 minutes in the hot air dryer set at 130° C. Then, both the strengths were compared.

In addition, after the heating, the pressure-sensitive adhesive label was peeled from the hard disk drive by hand so that the releasability was evaluated on the basis of the following criteria.

TABLE 3

|  | adhesive force (N/10 mm) | | releasability |
|---|---|---|---|
|  | before heating | after heating |  |
| Example 7 | 3.7 | 0.1 | ○ |
| Comparative Example 3 | 4.0 | 5.8 | x |

○: Possible to peel off easily by hand.
x: Troublesome to peel off by hand.

As is apparent from Table 3, the pressure-sensitive adhesive label according to Example 7 can be peeled from the hard disk drive easily only by heating the pressure-sensitive adhesive layer. In addition, after the peeling, no adhesive is left on the hard disk drive, and the label is not broken. It is considered that this is because the thermo-expandable microspheres are provided to have a function of reducing the adhesive force due to the pressure-sensitive adhesive layer by heating.

Incidentally, peeling of the pressure-sensitive adhesive label according to Comparative Example 3 was troublesome. In addition, after the peeling, residual adhesive was observed on the stuck surface of the housing of the hard disk drive.

Further, according to the pressure-sensitive adhesive label according to Example 7, the driving noise can be reduced by at least 1 dB if the pressure-sensitive adhesive label is stuck on a portion of a currently commercially available hard disk where an indication label had been stuck.

EXAMPLE 8

The following base D was used as the base.

Base A: A base D constituted by aluminum foil (7 μm thick), and a polyethylene terephthalate film layer (100 μm thick) was produced by a lamination system using dry lamination bonding.

A pressure-sensitive adhesive layer (50 μm thick) was formed out of an acrylic-based pressure-sensitive adhesive on the aluminum foil surface of the base D, and a release liner made of only a low-density polyethylene (LDPE) film was laminated on the pressure-sensitive adhesive layer. Thus, a base-including adhesive sheet (pressure-sensitive adhesive label D) in which the pressure-sensitive adhesive layer was protected by the release liner was produced.

The surface density of the pressure-sensitive adhesive label D was calculated in the state where the release liner was not laminated. As a result, the surface density was 0.21 $(kg/m^2)$.

EXAMPLE 9

The following base E was used as the base.

Base E: A base E constituted by aluminum foil (7 μm thick), and a polyethylene terephthalate film layer (100 μm thick) was produced by a lamination system using dry lamination bonding.

A pressure-sensitive adhesive layer (30 μm thick) was formed out of an acrylic-based pressure-sensitive adhesive on the aluminum foil surface of the base E, and three laminate pieces obtained in such a manner were stacked upon one another. That is, a laminate constituted by a base E, a pressure-sensitive adhesive layer, a base E, a pressure-sensitive adhesive layer, a base E and a pressure-sensitive adhesive layer was formed. A release liner made of only a low-density polyethylene (LDPE) film was laminated on the pressure-sensitive adhesive layer located on the surface of the laminate. Thus, a base-including adhesive sheet (pressure-sensitive adhesive label E) in which the pressure-sensitive adhesive layer located on the surface of the laminate was protected by the release liner was produced.

The surface density of the pressure-sensitive adhesive label B was calculated in the state where the release liner was not laminated. As a result, the surface density was 0.58 $(kg/m^2)$. On the other hand, the surface density of the laminate piece constituted by a base E and a pressure-sensitive adhesive layer was 0.19 $(kg/m^2)$.

EXAMPLE 10

The following base F was used as the base.

Base F: A base F composed of only aluminum foil (150 μm thick) was produced.

A pressure-sensitive adhesive layer (50 μm thick) was formed out of an acrylic-based pressure-sensitive adhesive on the aluminum foil surface of the base F, and a release liner made of only a low-density polyethylene (LDPE) film was laminated on the pressure-sensitive adhesive layer. Thus, a base-including adhesive sheet (pressure-sensitive adhesive label F) in which the pressure-sensitive adhesive layer was protected by the release liner was produced.

The surface density of the pressure-sensitive adhesive label F was calculated in the state where the release liner was not laminated. As a result, the surface density was 0.44 $(kg/m^2)$.

EXAMPLE 11

The following base G was used as the base.

Base G: A base G composed of only aluminum foil (150 μm thick) was produced.

A pressure-sensitive adhesive layer (320 μm thick) was formed out of an acrylic-based pressure-sensitive adhesive on the aluminum foil surface of the base G, and a release liner made of a polyethylene terephthalate (PET) film surface-treated with silicone was laminated on the pressure-sensitive adhesive layer. Thus, a base-including adhesive sheet (pressure-sensitive adhesive label G) in which the pressure-sensitive adhesive layer was protected by the release liner was produced.

The surface density of the pressure-sensitive adhesive label G was calculated in the state where the release liner was not laminated. As a result, the surface density was 0.71 $(kg/m^2)$

EXAMPLE 12

The following base H was used as the base.

Base H: A base H was produced by sticking a polyethylene terephthalate film (125 μm thick) to aluminum foil (150 μm thick) through an acrylic-based pressure-sensitive adhesive. Incidentally, the layer made of the acrylic-based pressure-sensitive adhesive in the base H was 50 μm thick.

A pressure-sensitive adhesive layer (50 μm thick) was formed out of an acrylic-based pressure-sensitive adhesive on the aluminum foil surface of the base H, and a release liner made of only a low-density polyethylene (LDPE) film was laminated on the pressure-sensitive adhesive layer. Thus, a base-including adhesive sheet (pressure-sensitive adhesive label H) in which the pressure-sensitive adhesive layer was protected by the release liner was produced.

The surface density of the pressure-sensitive adhesive label H was calculated in the state where the release liner was not laminated. As a result, the surface density was 0.69 $(kg/m^2)$.

Evaluation IV

Each of the pressure-sensitive adhesive labels obtained in Examples 8 to 12 were cut into the same shape as that of an indication label stuck in advance on the outer surface of a housing of a commercially available 3.5-inch hard disk drive. Next, the indication label stuck in advance was peeled from the commercially available 3.5-inch hard disk drive, and each of the pressure-sensitive adhesive labels according to Examples 8 to 12 cut into the same shape was stuck on the same place where the indication label had been stuck. Incidentally, each of the pressure-sensitive adhesive labels was not curled when the release liner was released, and the workability when the release liner was released was excellent.

Power was supplied to each of the hard disk drives on which the pressure-sensitive adhesive labels according to Examples 8 to 12 were stuck, so as to drive the hard disk drive. The noise level at the time of driving (driving noise) was measured by the same manner for the Example 1. Table 4 shows the result of the measurement.

Incidentally, at that time, as comparative examples, the driving noise of a commercially available 3.5-inch hard disk drive itself was measured in the same conditions as Examples 8 to 12. Measurement was carried out in the state where the indication label stuck in advance on the outer surface of the housing of the hard disk drive was left as it was (State 1: Comparative Example 4), and in the state where the indication label had been peeled off (State 2:

Comparative Example 5). The indication label stuck in advance on the commercially available hard disk drive was a label formed by vapor-depositing aluminum on the surface of a polyethylene terephthalate film. The surface density of the indication label was 0.14 (kg/m$^2$).

TABLE 4

|   | surface density (kg/m$^2$) | noise level (dB/A)) |
|---|---|---|
| Example 8 | 0.21 | 34.3 |
| Example 9 | 0.58 | 32.5 |
| Example 10 | 0.44 | 33.2 |
| Example 11 | 0.71 | 32.3 |
| Example 12 | 0.69 | 32.1 |
| Comparative Example 4 (State 1) | 0.14 | 39.3 |
| Comparative Example 5 (State 2) | — | 50.12 |

As is apparent from Table 4, by use of each of the pressure-sensitive adhesive labels according to Examples 8 to 12, the driving noise can be reduced by at least 1 dB if the pressure-sensitive adhesive label is stuck on a portion of a currently commercially available hard disk drive where an indication label had been stuck.

Further, according to each of the pressure-sensitive adhesive labels according to Examples 8 to 12, even if a release liner using a silicone-free release agent was used, there was no case that the pressure-sensitive adhesive label was curled when the release liner was released. Thus, the workability in sticking was also excellent.

Since a pressure-sensitive adhesive label according to the invention has a structure as described above, the function of indicating various kinds of information as a primary function of a pressure-sensitive adhesive label can be achieved simultaneously with the function of reducing noise generated when a hard disk drive is driven. In addition, when the release liner is released, it is possible to suppress or prevent generation of static electricity so that it is possible to reduce the amount of peeling electrification.

Also, since a pressure-sensitive adhesive label according to the invention has a structure as described above, the function of indicating various kinds of information as a primary function of a pressure-sensitive adhesive label can be achieved simultaneously with the function of reducing noise generated when a hard disk drive is driven. In addition, when a release liner is released, it is possible to suppress or prevent damage to the pressure-sensitive adhesive label. Further, the workability in sticking the pressure-sensitive adhesive label onto a hard disk drive can be improved.

Further, since a pressure-sensitive adhesive label according to the invention has a configuration as described above, the function of indicating various kinds of information which is a primary function as a pressure-sensitive adhesive label can be made compatible with the function of reducing noise generated when a hard disk drive is driven. In addition, when the pressure-sensitive adhesive label is peeled, it is possible to peel it easily only by heating.

Thus, in the pressure-sensitive adhesive label according to the invention, the work of peeling the pressure-sensitive adhesive label stuck wrongly or the work of peeling the pressure-sensitive adhesive label for the purpose of reuse of parts after retirement can be improved on a large scale. Thus, the pressure-sensitive adhesive label according to the invention can contribute to the improvement of working efficiency.

Still further, since a pressure-sensitive adhesive label according to the invention has a structure as described above, the function of indicating various kinds of information and/or the function of keeping airtightness as primary functions of the pressure-sensitive adhesive label, and the function of reducing noise generated when a hard disk drive is driven can be achieved simultaneously.

Thus, by use of the pressure-sensitive adhesive label and the method for reducing driving noise of a hard disk drive by use of the pressure-sensitive adhesive label according to the invention, the information indicating function and/or the airtightness keeping function as primary functions of the pressure-sensitive adhesive label can be satisfied simultaneously with the driving noise reducing function as a primary function of a sound-insulating/vibration-damping material, so that a measure to reduce driving noise of a hard disk drive, regarded as important particularly in recent years, can be taken. Thus, the pressure-sensitive adhesive label according to the invention can serve as a pressure-sensitive adhesive label for a hard disk drive having functions (effects) as two kinds of members, that is, the information indicating function and/or the airtightness keeping function as a pressure-sensitive adhesive label, and a function as a sound-insulating/vibration-damping material so as to contribute to the improvement of economy or working efficiency.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A pressure-sensitive adhesive label for a hard disk drive, to be adapted for being stuck on an outer surface of a housing of said hard disk drive so as to reduce noise generated when said hard disk drive is driven, said label comprising:
    a base having an information indication portion on a first surface thereof;
    a pressure-sensitive adhesive layer formed on a second surface of said base and having a function of reducing its adhesive force by heating; and
    wherein said pressure-sensitive adhesive layer is formed of a pressure-sensitive adhesive composition containing a thermo-foamable agent which can be foamed by heating.

2. A pressure-sensitive adhesive label for a hard disk drive according to claim 1, wherein said thermo-foamable agent comprises thermo-expandable microspheres.

3. A pressure-sensitive adhesive label for a hard disk drive according to claim 1, wherein said base comprises a metal foil and resin film layers laminated on opposite sides of said metal foil.

4. A pressure-sensitive adhesive label for a hard disk drive according to claim 3, wherein said metal foil is not thinner than 5 µm.

5. A pressure-sensitive adhesive label for a hard disk drive according to claim 3, wherein each of said resin film layers comprises a polyethylene terephthalate film.

6. A method for peeling a pressure-sensitive adhesive label for a hard disk drive according to claim 1 from a hard disk drive on which said pressure-sensitive adhesive label has been stuck, comprising steps of:
    heating said hard disk drive on which said pressure-sensitive adhesive label has been stuck, so as to heat at least said pressure-sensitive adhesive layer of said pressure-sensitive adhesive label; and
    peeling said pressure-sensitive adhesive label from said hard disk drive.

7. A pressure-sensitive adhesive label for a hard disk drive, to be adapted for being stuck on an outer surface of a housing of said hard disk drive so as to reduce noise generated when said hard disk drive is driven, said label comprising:

a base having an information indication portion on a first surface thereof; and a pressure-sensitive adhesive layer formed on a second surface of said base;

wherein said pressure-sensitive adhesive label has a surface density of not lower than 0.18 (kg/m$^2$).

8. A pressure-sensitive adhesive label for a hard disk drive according to claim 7, wherein said base comprises a metal foil and resin film layers laminated on opposite sides of said metal foil.

9. A pressure-sensitive adhesive label for a hard disk drive according to claim 8, wherein said metal foil is not thinner than 5 μm.

10. A pressure-sensitive adhesive label for a hard disk drive according to claim 8, wherein each of said resin film layers comprises a polyethylene terephthalate film.

11. A method for reducing driving noise of a hard disk drive including a box-shaped housing body for receiving recording disks, and a top cover paired with said housing body, comprising a step of:

sticking a pressure-sensitive adhesive label according to claim 7 onto an outer surface of at least one of said top cover and said housing body.

12. A method for reducing driving noise of a hard disk drive including a box-shaped housing body for receiving recording disks, and a top cover paired with said housing body, comprising a step of:

sticking a pressure-sensitive adhesive label according to claim 7 onto a bore formed in at least one of said top cover and said housing body.

* * * * *